United States Patent
Wallace (10) Patent No.: US 9,348,021 B2
(45) Date of Patent: May 24, 2016

(54) METHODS AND APPARATUS FOR ADAPTIVE MOTION COMPENSATION TO REMOVE TRANSLATIONAL MOVEMENT BETWEEN A SENSOR AND A TARGET

(71) Applicant: Raytheon Company, Waltham, MA (US)

(72) Inventor: Aaron C. Wallace, Melissa, TX (US)

(73) Assignee: Raytheon Company, Waltham, MA (US)

( * ) Notice: Subject to any disclaimer, the term of this patent is extended or adjusted under 35 U.S.C. 154(b) by 446 days.

(21) Appl. No.: 13/826,683

(22) Filed: Mar. 14, 2013

(65) Prior Publication Data

US 2016/0061946 A1    Mar. 3, 2016

(51) Int. Cl.
| | |
|---|---|
| *G01S 13/52* | (2006.01) |
| *G01S 13/524* | (2006.01) |
| *G01S 13/18* | (2006.01) |
| *G01S 7/41* | (2006.01) |

(52) U.S. Cl.
CPC ............. *G01S 13/5242* (2013.01); *G01S 7/414* (2013.01); *G01S 13/18* (2013.01); *G01S 13/5244* (2013.01)

(58) Field of Classification Search
CPC ............ G01S 13/5244; G01S 13/9029; G01S 13/5242; G01S 13/18; G01S 7/414
USPC .................................................. 342/159–164
See application file for complete search history.

(56) References Cited

U.S. PATENT DOCUMENTS

| | | | |
|---|---|---|---|
| 3,939,474 A | 2/1976 | Coleman et al. | |
| 4,093,950 A | 6/1978 | ap Rhys | |
| 4,093,951 A | 6/1978 | ap Rhys | |
| 4,121,209 A | 10/1978 | ap Rhys | |
| 4,244,036 A | 1/1981 | Raven | |
| 4,589,610 A | 5/1986 | Schmidt | |
| 5,117,360 A | 5/1992 | Hotz et al. | |
| 5,245,347 A | 9/1993 | Bonta et al. | |
| 5,539,412 A | 7/1996 | Mendelson | |
| 5,559,515 A | 9/1996 | Alimena et al. | |
| 5,559,516 A | 9/1996 | Didomizio et al. | |
| 5,559,517 A | 9/1996 | Didomizio | |
| 5,559,518 A | 9/1996 | DiDomizio | |
| 5,644,315 A | 7/1997 | Long | |
| 5,818,383 A | 10/1998 | Stockburger et al. | |
| 5,990,824 A * | 11/1999 | Harrison .................. | G01S 13/91 342/159 |

(Continued)

FOREIGN PATENT DOCUMENTS

| | | |
|---|---|---|
| WO | WO 94/07156 A1 | 3/1994 |
| WO | WO 2011/053536 A1 | 5/2011 |

OTHER PUBLICATIONS

Search Report under Section 17 in Application No. GB1308061.9 filed on May 3, 2013, 5 pages.

(Continued)

*Primary Examiner* — John B Sotomayor
*Assistant Examiner* — Marcus Windrich
(74) *Attorney, Agent, or Firm* — Daly, Crowley, Mofford & Durkee, LLP (57) ABSTRACT

Methods and apparatus for performing adaptive motion compensation to remove translational movement between a sensor and a target using data from the sensor. After whitening, data can be processed to select a target and focus frequency components. Dynamic sliding window processing can be performed on processed time domain data to estimate an instantaneous range rate for the target.

20 Claims, 7 Drawing Sheets

(56) References Cited

U.S. PATENT DOCUMENTS

| | | | |
|---|---|---|---|
| 6,046,695 A * | 4/2000 | Poehler | G01S 13/90 342/25 A |
| 6,307,501 B1 | 10/2001 | Wills et al. | |
| 6,310,575 B1 * | 10/2001 | Chabah | G01S 7/2927 342/159 |
| 6,400,306 B1 * | 6/2002 | Nohara | G01S 13/5244 342/160 |
| 6,633,253 B2 | 10/2003 | Cataldo | |
| 6,765,526 B1 | 7/2004 | Doerry | |
| 6,809,681 B1 | 10/2004 | Niechayev | |
| 6,809,682 B1 * | 10/2004 | Madewell | G01S 13/24 342/159 |
| 6,882,321 B2 | 4/2005 | Tietjen | |
| 7,038,618 B2 | 5/2006 | Budic | |
| 7,109,911 B1 * | 9/2006 | Cataldo | G01S 13/90 342/159 |
| 7,129,901 B2 | 10/2006 | Tietjen | |
| 7,183,989 B2 | 2/2007 | Tietjen | |
| 7,199,764 B2 | 4/2007 | Tietjen et al. | |
| 7,339,540 B2 | 3/2008 | Tietjen | |
| 7,369,083 B2 | 5/2008 | Budic | |
| 7,456,780 B1 | 11/2008 | Garren | |
| 7,978,124 B2 | 7/2011 | Cook et al. | |
| 8,125,374 B2 | 2/2012 | Edwards | |
| 8,169,362 B2 | 5/2012 | Cook et al. | |
| 8,314,732 B2 | 11/2012 | Oswald et al. | |
| 8,362,942 B2 | 1/2013 | McNeill et al. | |
| 2010/0259442 A1 * | 10/2010 | Abatzoglou | G01S 13/282 342/25 A |
| 2012/0139777 A1 * | 6/2012 | Hunter | G01S 13/5244 342/175 |
| 2013/0009807 A1 | 1/2013 | Lamb | |
| 2013/0257645 A1 * | 10/2013 | Penney | G01S 13/5244 342/159 |

OTHER PUBLICATIONS

"Moving target indication", from Wikipedia, the free encyclopedia; http://en.wikipedia.org/wiki/Moving_target_indication; 4 pages.

Notification of Transmittal of the International Search Report and the Written Opinion of the International Searching Authority, or the Declaration, PCT/US2014/019239, date of mailing May 9, 2014, 4 pages.

Written Opinion of the International Searching Authority, PCT/US2014/019239, date of mailing May 9, 2014, 8 pages.

Application No. 1308061.9 Response filed on Jan. 8, 2016 17 pages.

United Kingdom Office Action dated Nov. 12, 2015; for U.K. Pat. App. No. GB1308061.9; 4 pages.

PCT International Preliminary Report on Patentability and Written Opinion of the ISA dated Sep. 24, 2015; for PCT Pat. App. No. PCT/US2014/019239; 10 pages.

* cited by examiner

METHODS AND APPARATUS FOR ADAPTIVE MOTION COMPENSATION TO REMOVE TRANSLATIONAL MOVEMENT BETWEEN A SENSOR AND A TARGET

BACKGROUND

As is known in the art, there are a variety of techniques for addressing motion of objects in radar return signals. One known method to address an unknown motion problem is to use an MIT (moving target indicator) radar dwell to obtain an estimate of target range rate, which can be used on a subsequent radar imaging dwell to compensate for target linear motion. However, with this technique, the range rate information can become stale between the MTI dwell and imaging dwell, and any non-uniform motion may not be handled by the fixed range rate parameter from MTI.

It is also possible to estimate the target range rate from its Doppler location within the range-Doppler map. This location translates to a range rate, however, it is possible that the target could be aliased in Doppler. Unwrapping the aliases may be possible by checking for range-walk. Using the range-Doppler map solves the latency problem associated with using an MTI dwell, but may not allow for time-dependent motion compensation over the imaging Coherent Processing Interval (CPI).

Another known method attempts to estimate target acceleration. However, motion models may not be realistic, especially over longer CPIs. For maritime targets, data-driven techniques for motion compensation have been used. These techniques look for phase changes between successive pulses to estimate an instantaneous range rate. This measurement tends to be noisy, so smoothing filters are implemented to reduce noise. However, causal smoothing filters have the effect of introducing a time lag between the motion estimate and truth, where the size of the lag depends on the filter gain. Also, these methods do not have to address competing ground clutter. Maritime targets generally have a sufficiently large RCS (radar cross section) that the ship scatterers dominate the motion compensation solution over the background sea clutter. However, such methods may not work for smaller land targets that are competing with much larger ground clutter.

SUMMARY

The present invention provides method and apparatus for adaptive motion compensation (AMC) for a target in radar signal return. Exemplary embodiments of the invention address certain shortcomings of known techniques for addressing motion of a target including non-fluid target motion and dramatic translational and rotational accelerations, such as a vehicle travelling on a road. In general, exemplary embodiments of the invention do not use a causal smoothing filter since the self-calibrated radar returns will be lagging the true motion compensation solution. In exemplary embodiments of the invention, motion compensation is computed for each pulse, with the subject pulse being at the center of a motion compensation window for eliminating lag; from a causal smoothing filter. In addition, exemplary embodiments of the invention remove ground clutter to permit pulse-to-pulse phase estimation. The lagged conjugate pulse product will be dominated by ground clutter if not properly removed prior to phase estimation.

Exemplary embodiments of the invention allow pulse-to-pulse phase estimation to be used in the presence of ground clutter by first removing the ground clutter returns, which is more precise than estimating target range walk through range cells. In one embodiment, adaptive motion compensation in accordance with the invention uses windowing the self-calibrating motion compensation data centered on the data to be compensated, and removing ground clutter in the Doppler domain to permit pulse-to-pulse phase estimation of the target in slow-time.

Using a phase-gradient provides highly accurate motion compensation to remove translational motion between the target and sensor phase center in accordance with exemplary embodiments of the invention, which are useful for example, for maritime targets that generally are not competing with clutter. Inventive adaptive motion compensation addresses estimation of lag/noise and the use of phase-gradient techniques in the presence of competing ground clutter.

Exemplary embodiments of the invention can include a clutter whitener to allow use of phase-gradient methods in presence of ground clutter for reducing the influence of competing clutter to obtain an improved estimate of target motion. A centered sliding window lag product can be used to provide noise-suppression without introducing IIR filter lag. Adaptive selection of a sliding window size uses phase coherence to adaptively control phase noise suppression. In situations where phase noise is low, a smaller window can be chosen to reduce smoothing. In situations where phase noise is high, a larger window can be chosen to suppress estimation noise (loss of higher frequency components such as vibrational components).

In one aspect of the invention, a method comprises performing adaptive motion compensation to remove translational movement between a sensor and a target using data from the sensor by: performing, using a computer processor, clutter removal from the data using a whitener, using the whitened data to select a target for which adaptive motion compensation should be performed, using weighting in the Doppler domain to reduce frequency components for data for the selected target, transforming the weighted. Doppler domain data to time domain data, and performing dynamic sliding window processing on the time domain data to estimate an instantaneous range rate for the target.

The method can further include one or more of the following features: centering the window on a time of a pulse for which the instantaneous range rate is computed, adaptively determining a size of the window based upon coherence of the data, for target range cells above a coherence threshold, computing a phase gradient, converting the phase gradient to the instantaneous range rate, using a single pulse repetition frequency (PRF) for the adaptive motion compensation processing, performing clutter estimation, the clutter estimation includes land clutter or sea clutter determination, using a concavity of a clutter lag profile and/or distance in frequency of a measured clutter peak from an expected clutter peak, wherein the lag profile is computed from augment cells, the sensor forms part of a radar system having an antenna secured to an airborne or space-based platform, and/or receiving radar system parameters comprising integration time and smoothing filter gain.

In another aspect of the invention, an article comprises: a computer readable medium containing stored, non-transitory instructions that enable a machine to perform: performing adaptive motion compensation to remove translational movement between a sensor and a target using data from the sensor by: performing, using a computer processor, clutter removal from the data using a whitener, using the whitened data to select a target for which adaptive motion compensation should be performed, using weighting in the Doppler domain to reduce frequency components for data for the selected target, transforming the weighted Doppler domain data to time domain data, and performing dynamic sliding window processing on the time domain data to estimate an instantaneous range rate for the target.

The article can further include instructions for one or more of the following features: centering the window on a time of a pulse for which the instantaneous range rate is computed, adaptively determining a size of the window based upon coherence of the data, for target range cells above a coherence threshold, computing a phase gradient, converting the phase gradient to the instantaneous range rate, using a single pulse repetition frequency (PRF) for the adaptive motion compensation processing, performing clutter estimation, the clutter estimation includes land clutter or sea clutter determination, using a concavity of a clutter lag profile and/or distance in frequency of a measured clutter peak from an expected clutter peak, wherein the lag profile is computed from augment cells, the sensor forms part of a radar system having an antenna secured to an airborne or space-based platform, and/or receiving radar system parameters comprising integration time and smoothing filter gain.

In a further aspect of the invention, a system comprises: a sensor to illuminate an area, an antenna to receive signal return from the area, a clutter removal module to remove clutter from the signal return using a whitener, a target selection module to receive the clutter-removed data and to select a target for which adaptive motion compensation should be performed, a weighting module to use weighting in the Doppler domain to reduce frequency components for data for the selected target, a Doppler frequency module to perform Doppler frequency domain processing on the weighted target data, and a sliding, window module to process the Doppler frequency domain data transformed to time domain data to estimate an instantaneous range rate for the target for removing, translation movement between the sensor and the target.

The system can further include a processor configured to enable one or more of the following: centering the window on a time of a pulse for which the instantaneous range rate is computed, adaptively determining a size of the window based upon coherence of the data, for target range cells above a coherence threshold, computing a phase gradient, converting the phase gradient to the instantaneous range rate, using a single pulse repetition frequency (PRF) for the adaptive motion compensation processing, performing clutter estimation, the clutter estimation includes land clutter or sea clutter determination, using a concavity of a clutter lag profile and/or distance in frequency of a measured clutter peak from an expected clutter peak, wherein the lag profile is computed from augment cells, the sensor forms part of a radar system having an antenna secured to an airborne or space-based platform, and/or receiving radar system parameters comprising integration time and smoothing filter gain.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention provide methods and apparatus for adaptive motion compensation (AMC) to focus moving targets in radar imagery. Exemplary embodiments of the invention measure and remove uncompensated for motion between the sensor and the target being imaged. Inventive adaptive motion compensation embodiments are useful for land-based and maritime-based targets.

Figure 1:
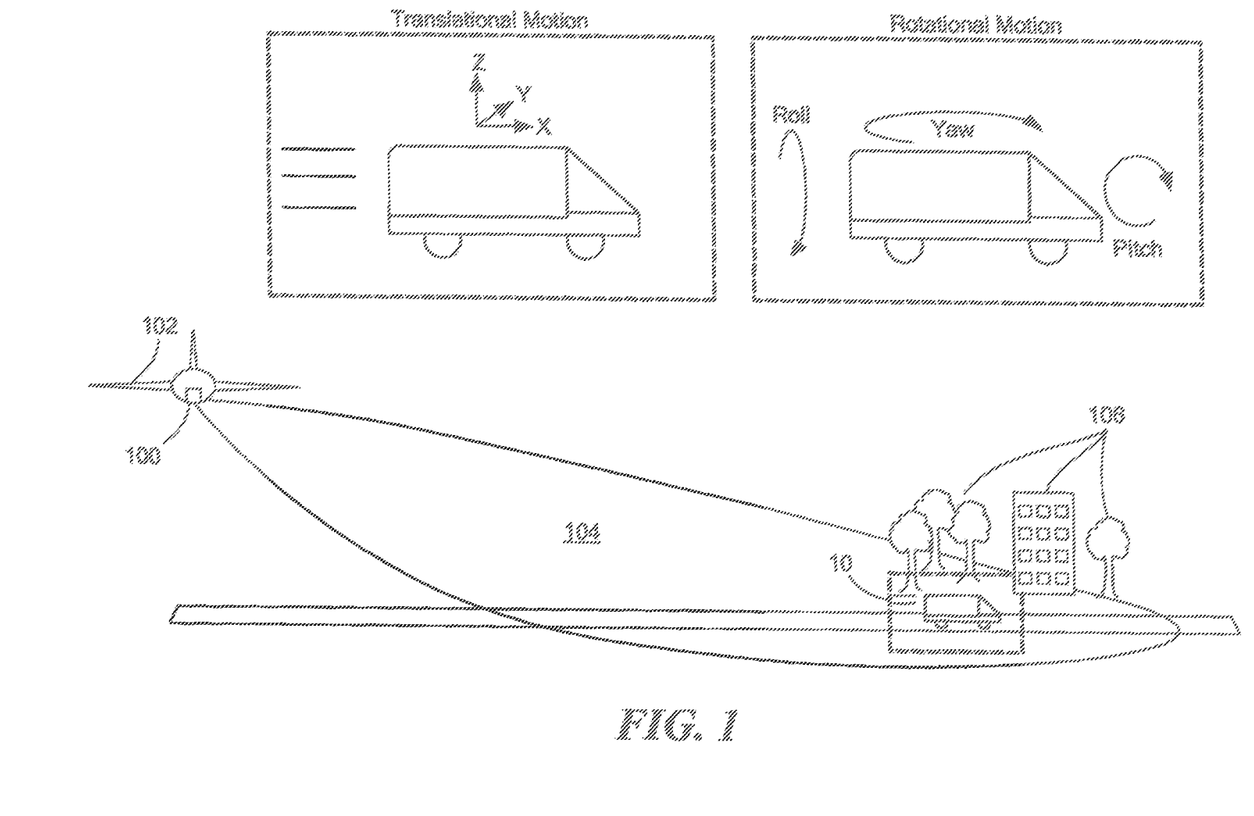
FIG. 1 is a schematic representation of translational motion between a sensor and a target that is removed in accordance with exemplary embodiments of the invention.

As shown in FIG. 1, when an airborne radar 100, for example, on an aircraft 102, illuminates a patch of ground containing clutter 106 and ground moving targets 10, the received radar samples are generally range-stabilized (i.e. platform motion is removed) to the stationary patch of ground being illuminated by the radar beam. However, a moving target 10 within the illumination 104 of the radar beam will generally not be stabilized, in range, unless its direction of motion is orthogonal to the beam line-of-sight. If the target has sufficiently high range rate to move its signature into the exo-clutter region of a range-Doppler map, the moving target is detectable using Moving Target Indicator (MTI) processing.

Since MTI dwells are generally short and use waveforms with coarser ran resolution than radar imaging modes, non-uniform motion over the duration of a coherent processing interval (CPI) is sufficiently small that range-walk and Doppler smearing have a relatively small impact on detection performance. Radar imaging modes, such as High Range Resolution (HRR) profiling or Inverse Synthetic Aperture Radar (ISAR), require finer motion compensation to produce high-quality imagery. These modes generally use a longer CPI than MTI to obtain acceptable Doppler resolution, and are therefore more susceptible to range-walk and Doppler smearing due to many factors, including:

Non-uniform target motion (target acceleration),
Errors in the platform motion compensation (un-sensed motion), and
Turbulent troposphere (time and spatially varying index of refraction).

The severity of these errors depends largely on the specific design of the platform itself, including the operating wavelength, the fidelity of the platform's own motion information, the ability of the sensor to accurately project its position into the future, and the latency of target range rate information provided for motion compensation.

Exemplary embodiments of the invention provide adaptive motion compensation processing to estimate and compensate for translational motion between the target and the sensor to a relatively small fraction of a wavelength. This ensures a near-ideal impulse response in Doppler, and minimizes range-walk of scatterers over the duration of the CPI, in severe cases, where there is significant target acceleration (i.e., due to target stopping, speeding up, or turning), several dB of SNR may be recovered as a result of proper alignment of the time-domain data prior to Fourier trans form.

Figure 2:
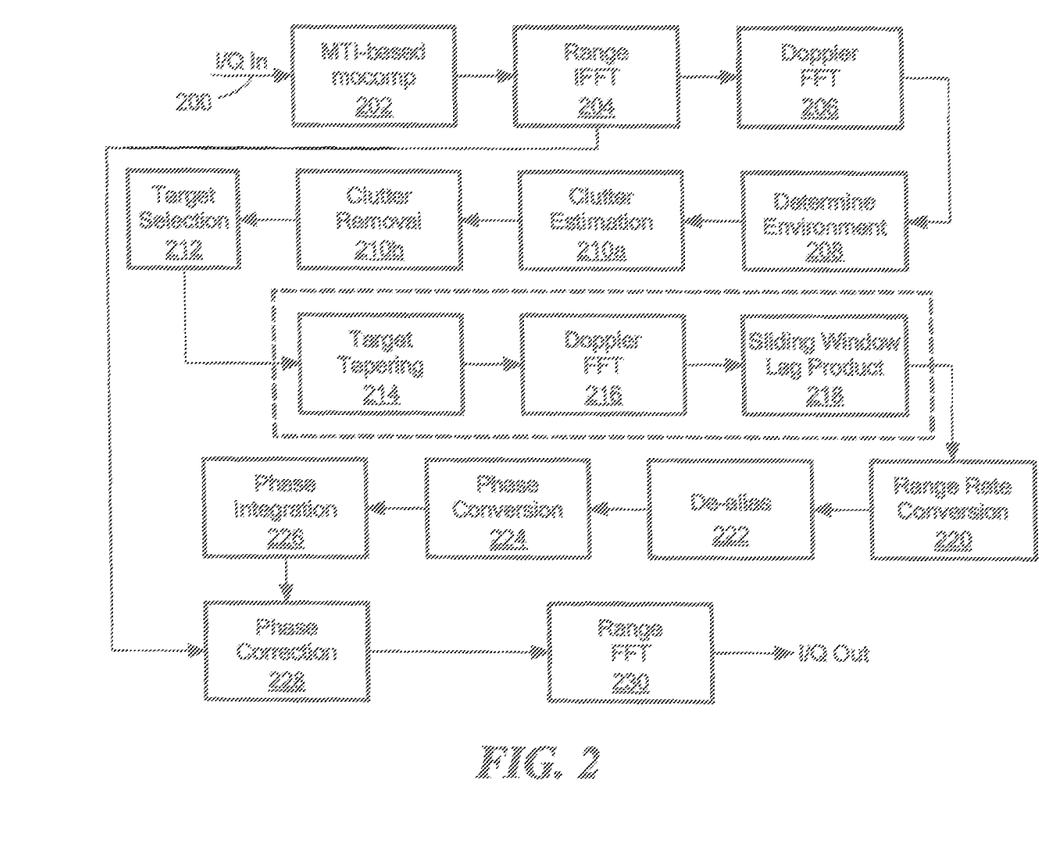
FIG. 2 is a functional block diagram for adaptive motion compensation in accordance with exemplary embodiments of the invention.

FIG. 2 shows an exemplary functional block diagram of adaptive motion compensation in accordance with exemplary embodiments of the invention. I/Q input 200 is assumed to be range stabilized to at least range cell resolution. If there is range rate information on the target from tracking information or a prior MTI dwell, this information is used to perform initial motion compensation on the target for improving adaptive motion compensation performance.

MTI processing 202 provides MTI cues to facilitate resolving Doppler ambiguities. As long as the cue is within half an alias velocity of the HRR dwell, adaptive motion compensation processing can provide an instantaneous rate estimate in the correct Doppler alias. The HRR is assumed to be motion compensated to the range rate from the MTI cue prior to entering the adaptive motion compensation.

For adaptive motion compensation processing to begin, the data is transformed from the assumed domain in both dimensions. The MTI output is provided, to a range IFFT 204 the output of which is provided to a Doppler FFT 206. The output of the Range IFFT 204 receives the adaptive motion compensation correction information.

After processing by the Doppler FFT 206, a determine environment module 208 processes information to estimate the environment. While adaptive motion compensation processing may be optimal for over land, for example, an alternative optimization for a maritime environment may be used. Estimating the environment can later affect the amount of smoothing in the range rate estimate.

In an exemplary embodiment, a clutter estimation and removal module 210a,b is part of the adaptive motion compensation processing. Since adaptive motion compensation uses a phase-gradient approach to estimating the range rate, competing ground clutter should first be removed. A whitener can be used eliminate ground clutter. Since in exemplary embodiments of the invention it is assumed that the clutter map will be mostly exoclutter, the clutter ridge itself will be relatively narrow. It is understood that the degree of narrowness is a function of the sensor and platform. Adaptive motion compensation may be most useful on systems that can provide large exoclutter.

In one particular embodiment, a target selection module 212 uses a coherence metric to determine the suitability of a particular scatterer for adaptive motion compensation processing. It is understood that additional metrics can be used. In one embodiment, the coherence metric determines the width of the sliding window used to determine the instantaneous range rate. For scatterers with very high coherence, a smaller window may be used since less phase noise suppression is required. The benefit is a less-smoothed representation of a given scatterer instantaneous range rate. For scatterers with lower coherence, a larger number of "bounding pulses" are used to suppress noise in the range rate estimate.

A target tapering module 214 receives the target selection 212 output. Since the goal of adaptive motion compensation processing is to remove translational motion of a target, a weighting function (e.g., a low-pass filter) is applied, in the Doppler domain to reduce high-frequency components. The filter bandwidth is tunable as a design parameter for the overall goal of the HRR. For example, it may be desirable to retain target vibration signatures.

A Doppler FFT module 216 receives the output of the target tapering module 214. The Doppler HT module 216 transforms back to slow-time to compute the windowed, lag, product now that appropriate weighting has been applied and, the clutter has been removed.

A sliding window lag; product module 218 receives the Doppler FFT 216 output. Adaptive motion compensation processing buffers some number of pulses and uses future information to provide a better correction for previous pulses. Adaptive motion compensation processing also adaptively determines the appropriate size of this window based on the coherence of the data.

Known implementations of adaptively estimating target range rate typically rely on smoothing past estimates of the phase gradient. To achieve relevance at the time of the pulse being adaptively corrected, the gain of the smoothing filter could be set relatively high, increasing the noise of the estimate, or lower thus reducing the relevance of the estimate to the time of the correction.

An exemplary sliding window lag product computes the 1-lag product of the entire time series. A time series may be an entire dwell or a segment of a longer dwell (subaperture). A time-dependent range rate (estimate of target translational motion) is selected. The range rate at the time of a particular pulse is estimated. A window is placed centered on the pulse corresponding to the time of estimate. The window may be rectangular or weighted. The window size is determined for each scatterer based on its coherence. The complex lag product estimates are summed for which the angle is the phase gradient applicable at the time of the pulse at the window center. The phase gradient is converted to range rate and any wraps are de-aliased. The de-aliased range rate may be used for applying small range corrections. Data is then converted back to target phase. The phase gradient estimates are integrated over the duration of the time series. Phase corrections and any range shifts required to finely align target in range are then applied.

A range rate conversion module 220 ensembles and converts the phase gradient to a range rate. It may be possible, if desired, to produce a range-dependent adaptive motion compensation estimate. Such an estimate could be used for motion modeling.

A de-aliasing module 222 unwraps the range rate estimates since the phase gradient may be aliased, such as for long HRR dwells. A phase conversion module 224 estimates the range rate for the purpose of providing this estimate in the metadata of the final HRR product and for resolving aliases. Once this information is captured, a conversion back to phases is required to complete the adaptive motion compensation focusing.

A phase integration module 226 integrates the phases to produce the phase correction, for example, a cumulative sum of the phase gradient estimates. A phase correction module 228 applies a phase correction the input data (compressed range by pulse).

A range VET module 230 puts the data back in the same domain it was in when the adaptive motion compensation processing was initiated. Depending on the sensor range resolution, it may be desirable to make sub-range cell shifts to each pulse to finely align the scatterers in range.

It is understood that adaptive motion compensation processing in accordance with exemplary embodiments of the invention can contain a number of tuning parameters, such as integration times, smoothing filter gains, etc.

As noted above, exemplary embodiments of the invention provide adaptive motion compensation for high-fidelity motion compensation of a moving target using a coherent pulsed Doppler radar. In general, processing removes uncompensated motion between the sensor phase center and the moving target to provide a well-focused range-Doppler image. In exemplary embodiments of the invention, processing includes the use of a clutter whitener to remove or reduce clutter energy, and the use of an adaptively sized sliding window lag product to estimate the instantaneous range rate.

Figure 3:
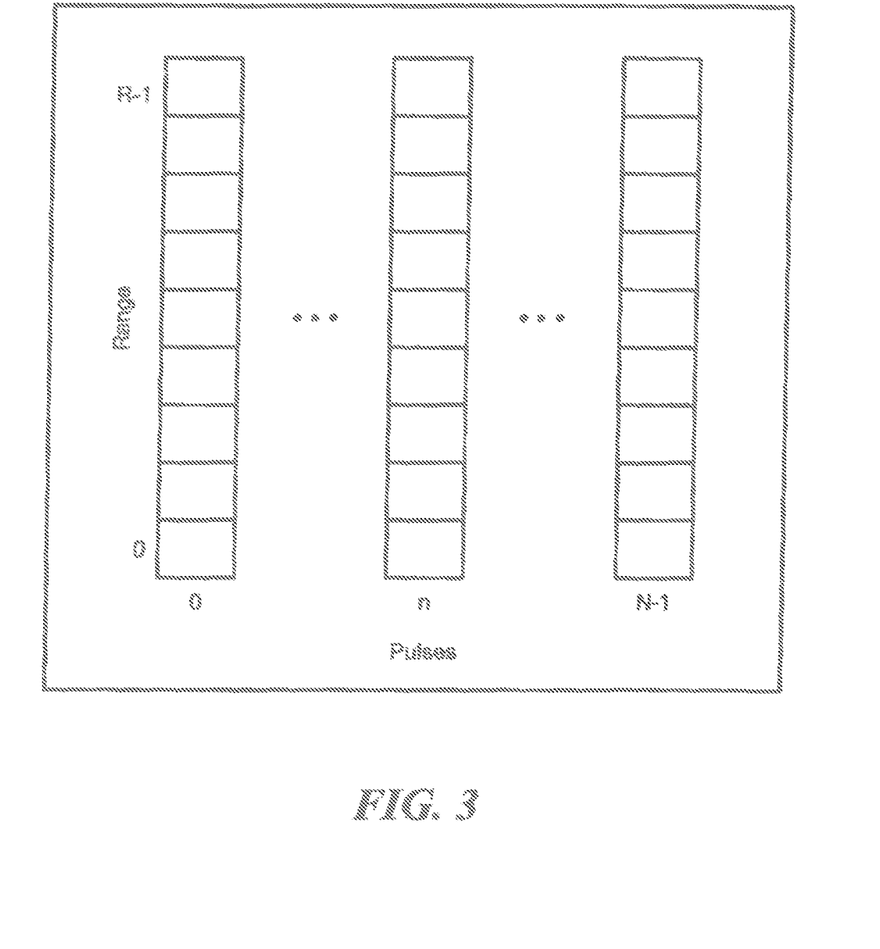
FIG. 3 is a schematic representation of pulses and range cells.

An exemplary implementation is described below. In one embodiment, input data has a format of a two-dimensional set of complex phase histories (I/Q). Input range vectors (first-time) contain the range samples, and the set of vectors makes up a coherent processing interval, such that $$z_{r,n} = a_{r,n} + jb_{r,n}, \text{ where } 0 \leq r \leq R-1, 0 \leq n \leq N-1,$$

where R is the number of range cells and Ai is the number of pulses in the CPI. It is assumed that the range vectors are range compressed, and that each vector is range stabilized. FIG. 3 shows an exemplary input format for data having pulses 0 to N−1 and range cells 0 R−1.

Figure 4A:
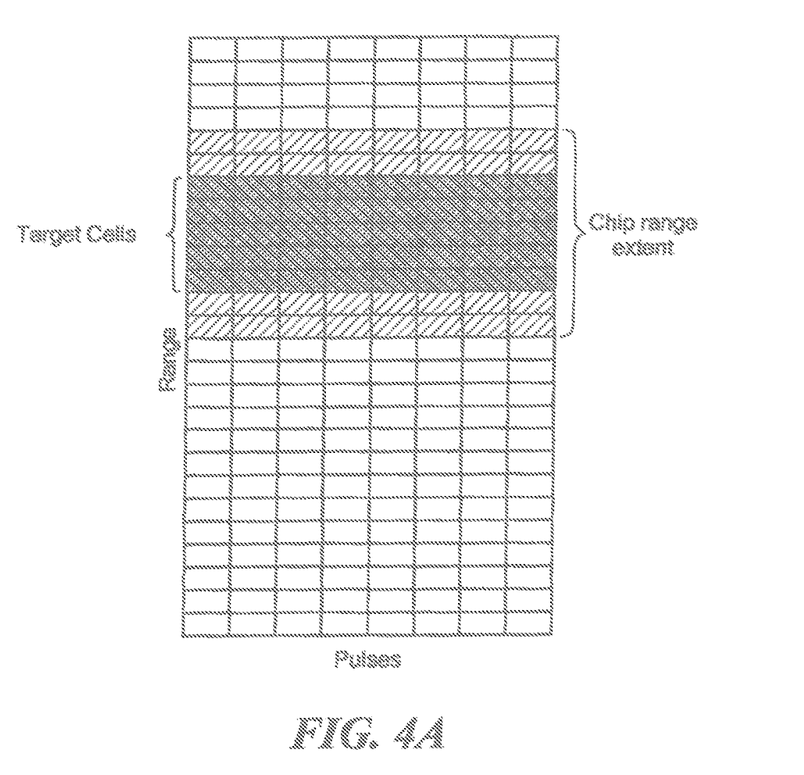
FIG. 4A is a schematic representation of chip range extent and target cells for pulses and range.
Figure 4B:
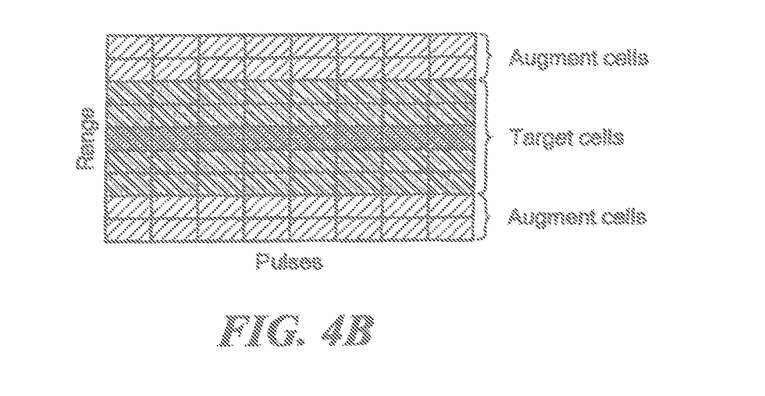
FIG. 4B is a schematic representation of augment and target cells for pulses and range.

As shown in FIG. 4A, a contact is assumed to be contained within a chip of $R_{chip}$ range cells, such that the contact lies at or near the center of the chipped range extent. It is further assumed that the chip range extent is sufficiently large to contain all target scatterers, with some margin of range cells on either side referred to as the augment cells, $R_{aug}$, and the center portion of the range extent referred to as target cells, $R_{tgt}$. FIG. 4A illustrates the chip extracted from the full range extent and FIG. 4B shows the segments of the chip range extent. These excess range cells will be used to estimate the clutter profile for the whitening process, as described more fully below.

It is assumed that the range chip contains only a single target. As described herein, inventive adaptive motion compensation will not be contaminated by other targets within the chip range extent provided that the other targets lie in the clutter cells, as shown in FIG. 4B. It is understood that in dense contact scenarios, additional steps may be required to isolate the targets.

Range stabilization is assumed to be to a constant target range rate applied to the chip, such as based on a prior GMTI contact report or estimated from an existing track. Deviations from this assumption do not preclude the use of the adaptive motion compensation, however the maximum allowable coherent processing interval will be reduced according to the limit described below for coherent processing interval considerations.

It is assumed that the coherent processing interval (CPI) is sufficiently short that target range walk over the CPI is less than one range resolution cell, $$dR \leq \dot{R}_{tgt} T_{CPI}$$

If the CPI is long enough that target range walk exceeds one resolution cell, the full CPI should be broken down into smaller, overlapping CPIs which must be stitched together in a manner well known in the art.

In general, exemplary embodiments of the invention providing adaptive motion compensation are useful in the presence of ground clutter. In other embodiments, performance against maritime targets is improved by skipping the clutter whitening processing. To that end, it may be desirable to first attempt to determine the clutter environment to improve subsequent adaptive motion compensation processing.

In exemplary embodiments, the clutter environment is determined from first and second parameters:

Concavity of the clutter lag profile, and
Distance (in Hertz) of the measured clutter peak from the expected clutter peak.

In a land clutter environment, the clutter lag profile tends to exhibit a high degree of pulse-to-pulse coherence and remains correlated as pulse lag time increases. Conversely, coherence for sea clutter is generally lower and experiences rapid de-correlation with increasing lag time. The second metric, clutter peak offset from the expected clutter peak, relies on the fact that ground clutter has a known Doppler centroid based purely on known platform motion and geometry. This assumes that the platform navigation data is accurate (i.e., minimal heading error), and that the clutter is relatively uniform. For the maritime scenario, sea clutter need not have a Doppler centroid at the corresponding line-of-sight velocity, although it not uncommon for sea clutter to exhibit this property.

To obtain a Doppler profile model of the clutter, a Fourier transform in slow-time forms a two-dimensional (2D) Range-Doppler data set, $$Z_{r,k} = \sum_{n=0}^{N-1} z_{r,n} e^{-j2\pi kn/N},$$

where $0 \leq k \leq N_{fft}-1$, $0 \leq r \leq R-1$.

The output of the Fourier transform produces "FFT-ordered" Doppler vectors, such that negative Doppler frequencies are represented on the right half of the vector and positive frequencies occupy the left half, with 0 Hz Doppler located in the first (left-most) Doppler bin.

The lag profile, for the purpose of clutter environment processing, is computed from the augment cells, $$X_{r,\ell} = \sum_{n=N_{lag}}^{N-1} Z_{r,n} Z^*_{r,n-\ell},$$

$$0 \leq r \leq R_{aug} - 1,$$

$$R_{chip} - R_{aug} \leq r \leq R_{chip} - 1,$$

$$0 \leq \ell \leq N_{lag}.$$

Note the use of the original input vectors, $z_{r,n}$, and * denotes complex conjugate. Also, it is understood that $N_{lag}$ is an implementation detail which will be based on the specific sensor used to collect the data.

The behavior of the clutter coherence as a function of lag time is desired. Coherence is computed from $\chi_{r,l}$, $$\gamma_{r,\ell} = \frac{|X_{r,\ell}|}{\sum_{n=N_{lag}}^{N-1} |Z_{r,n} Z_{r,n-\ell}|},$$

$$0 \leq r \leq R_{aug} - 1,$$

$$R_{chip} - R_{aug} \leq r \leq R_{chip} - 1,$$

$$0 \leq \ell \leq N_{lag}, \text{ and}$$

$$\eta_\ell = \frac{1}{2R_{aug}} \left( \sum_{r=0}^{R_{aug}-1} \gamma_{r,\ell} + \sum_{r=R_{chip}-R_{aug}}^{R_{chip}-1} \gamma_{r,\ell} \right)$$

To capture this behavior as a single metric, $\eta_e$ is fit to a polynomial of second order, for example, such that the resulting coefficients are $[\xi_2\ \xi_1\ \xi_0]$. The coefficient $\xi_2$ then specifies the magnitude and direction of concavity.

The clutter peak search utilizes the Range-Doppler data described above. It is convenient to shift $z_{r,k}$ such that 0 Hz Doppler frequency appears at the center of the Doppler profile, where the clutter peak is expected, $$C_{r,k}^{shift} = \begin{cases} |Z_{r,N_{FFT}/2+k}|^2, & \text{where } 0 \le r \le R_{aug}-1, \\ & R_{chip}-R_{aug} \le r \le R_{chip}-1, \\ & 0 \le k \le N_{fft}/2-1 \\ |Z_{r,k-N_{FFT}/2}|^2, & \text{where } 0 \le r \le R_{aug}-1, \\ & R_{chip}-R_{aug} \le r \le R_{chip}-1, \\ & N_{fft}/2 \le k \le N_{fft}-1 \end{cases}$$

The location of the Doppler maximum for each range cell in the clutter cells is computed from $C_{r,k}^{shift}$ to get $D_r^{peak}$, the collection of maximums for each range cell. Then the clutter peak is the median value of $D_r^{peak}$, $\psi^{peak} = \text{median}(D_r^{peak})$, where $0 \le r \le R_{avg}-1$, $R_{chip}-R_{aug} \le r \le R_{chip}-1$.

The clutter peak $\psi^{peak}$ is used to define the Doppler profile cells which are used to smoothly estimate the clutter peak using a polynomial fit. The Doppler profile of the peak is $$C_k^{profile} = \sum_{r=0}^{R_{aug}-1} C_{r,k}^{shift} + \sum_{r=R_{chip}-R_{aug}}^{R_{chip}-1} C_{r,k}^{shift},$$

where $\psi^{peak} - \beta \le k \le \psi^{peak} + \beta$, where $\beta$ is a tuning parameter that specifies the width in Doppler bins of the clutter ridge, which can be based on the known sensor beamwidth, $C_k^{profile}$ is then fit to a second order polynomial, such that the resulting coefficients are $[\lambda_2\ \lambda_1\ \lambda_0]$. The final estimate of the clutter peak is then determined by, $$C^{peak} = \begin{cases} \dfrac{-\lambda_2}{2\lambda_1}, & \text{if } \lambda_2 < 0 \\ \psi^{peak}, & \text{if } \lambda_2 \ge 0 \end{cases}.$$

If $\xi_2$ is a large negative number, the clutter exhibits strong loss of coherence as a function of lag time, which implies a sea clutter environment. Conversely, if $\xi_2$ has only a small negative value, then the clutter environment demonstrates slow loss of coherence as a function of time which is more consistent with land clutter. Furthermore, if $C_{peak}$ is close to the expected clutter peak for stationary clutter, this supports the conclusion that the environment is land. If $C_{peak}$ is some number of Doppler cells away from the expected stationary clutter peak, it is reasonable to conclude that the environment is sea clutter. These pieces of information together may be used to estimate the clutter environment.

If the clutter environment is determined to be land, then the following applies. A combination of clutter masking and clutter whitening is used to isolate the moving target from background land clutter. Prior to applying the masking and whitening, the Doppler data is circularly shifted such that the peak clutter cell is centered on the first Doppler bin, which corresponds to 0 Hz Doppler frequency. The size of the circular shift is $$N_{shift} = \text{mod}\left(C^{peak} - \frac{N_{fft}}{2}, N_{fft}\right),$$

such that $N_{shift}$ is non-negative, and $$Z_{r,k}^{shift} = \begin{cases} Z_{r,k+N_{shift}}, & \text{where } 0 \le r \le R_{chip}-1, \\ & 0 \le k \le N_{fft}-N_{shift}-1 \\ Z_{r,k+N_{shift}-N_{fft}}, & \text{where } 0 \le r \le R_{chip}-1, \\ & N_{fft}-N_{shift} \le k \le N_{fft}-1 \end{cases}.$$

Since this is a land scene, $z_{r,k}^{shift}$ is set to zero for Doppler frequencies within the −3 dB beamwidth, $\theta_{beam}$, of the receive channel. The −3 dB Doppler frequency is approximately $$f_d^{crop} = \frac{2}{\lambda}\left(V_{sensor}\sin\left(\frac{\theta_{beam}}{2}\right)\right),$$

where $\lambda$ is the sensor wavelength at center frequency and $v_{sensor}$ is the sensor velocity over the dwell, which is assumed to be constant. Then the number of Doppler cells to set to zero is $N_{crop} \lfloor f_d^{crop} T_{PRI} N_{fft} \rfloor$, where $T_{PRI}$ is the pulse repetition frequency and $\lfloor \ \rfloor$ represents the floor function. Applying the cropping, $$Z_{r,k}^{crop} = \begin{cases} 0, & \text{where } 0 \le r \le R_{chip}-1, \\ & 0 \le k \le N_{crop}-1, N_{fft}-N_{crop} \le k \le N_{fft}-1 \\ Z_{r,k}^{shift}, & \text{where } 0 \le r \le R_{chip}-1, N_{crop} \le k \le N_{fft}-N_{crop}-1. \end{cases}$$

Ground clutter whitening is used to improve performance for slow-moving targets, or targets whose Doppler frequency is abased and is competing with background clutter. Prior to whitening, the background noise level of the exoclutter is estimated, in this implementation, the noise estimate is computed using range cells away from the center of the chip range extent to reduce the probability of target returns affecting the estimate, such that $\chi_{noise}$ is an order statistic of the power of all cells in $z_{r,k}^{crop}$ in the range $0 \le r \le \lfloor \beta_n R_{chip} \rfloor$, $\lfloor R_{chip}(1-\beta_n) \rfloor \le r \le R_{chip}-1$, and $N_{crop} \le k \le N_{fft}-N_{crop}-1$, where $\beta_n$ is an implementation parameter equal to the fraction of range extent on either side of the chip that is assumed to not contain target scatterers.

The clutter envelope as a function of Doppler frequency is estimated for range cells in the chip. The approach used here is a simple average power of all range cells, $$\rho_k = \begin{cases} \sum_{r=0}^{R_{chip}-1} |Z_{r,k}^{crop}|^2 + |Z_{r,N_{fft}-k}^{crop}|^2, & \text{where } N_{crop} \le k \le \min\left(\dfrac{2N_{crop}-1,}{\dfrac{N_{fft}}{2}-1}\right) \\ 0, & \text{otherwise}. \end{cases}$$

Note that positive Doppler frequencies are added to like negative Doppler frequencies since it is expected that the receive pattern is roughly symmetric.

From the Doppler profile of the clutter envelope, weights are computed which whiten the data such that target scatterers are not competing with clutter energy. In one embodiment, the weights are computed as $$\mu_k = \left(\frac{R_{chip} \chi_{noise}}{2\rho_k}\right)^{\frac{1}{2}}.$$

The weights $\mu_k$ are then applied to the complex data as follows, $$Z_{r,k}^w = \begin{cases} Z_{r,k}^{crop}, & \text{where } 2N_{crop} \leq k \leq N_{fft} - 2N_{crop} - 1 \\ & \text{where } 0 \leq k \leq 2N_{crop} - 1, \\ \mu_k Z_{r,k}^{crop}, & N_{fft} - 2N_{crop} \leq k \leq N_{fft} - 1. \end{cases}$$

The next step in the clutter processing shifts the whitened complex data back to its original Doppler frequencies to avoid biasing the estimates, $$Z_{r,k}^{ws} = \begin{cases} Z_{r,k+M_{shift}}^w, & \text{where } 0 \leq r \leq R_{chip} - 1, \\ & 0 \leq k \leq N_{fft} - M_{shift} - 1 \\ & \text{where } 0 \leq r \leq R_{chip} - 1, \\ Z_{r,k+M_{shift}-N_{fft}}^w, & N_{fft} - M_{shift} \leq k \leq N_{fft} - 1, \end{cases}$$

where $M_{shift} = N_{fft} - N_{shift}$.

Now that competing ground clutter has been cropped out or whitened, pulse-to-pulse phase estimation can occur without interference from non-target scatterers. Note that $z_{r,k}^{ws}$ is in the compressed range (fast-time) and Doppler frequency domain.

An inverse Fourier transform in Doppler begins pulse processing, $$\tilde{Z}_{r,n} = \sum_{k=0}^{N_{fft}-1} Z_{r,k} e^{j2\pi kn/N_{fft}},$$

where $0 \leq n \leq N_{fft}-1$, $0 \leq r \leq R-1$.

A lag product is computed over the pulses (slow-time) for each range cell to get an estimate of the phase change between adjacent pulses, $$\tilde{\chi}_{r-R_{avg},n} = \tilde{Z}_{r,n} \tilde{Z}_{r,n-1}^*, R_{aug} \leq r \leq R_{chip} - R_{aug} - 1, 1 \leq n \leq N_{fft} - 1.$$

Note that $\tilde{\chi}_{r,0} = 0$ for $R_{aug} \leq r \leq R_{chip} - R_{aug} - 1$.

Phase coherence over the dwell is used to determine whether a particular scatterer (range cell) will be used in the adaptive motion compensation estimate, in one embodiment, the coherence is $$\gamma_r = \frac{\left|\sum_{n=0}^{N_{fft}-1} \tilde{\chi}_{r,n}\right|}{\sum_{n=0}^{N_{fft}-1} |\tilde{\chi}_{r,n}|}.$$

The coherence $\gamma_r$ is used to determine whether the range cell, r, should be used for the adaptive motion compensation solution, $$I_r = \begin{cases} 0, & \text{where } \gamma_r \leq \gamma_{thresh} \\ 1, & \text{where } \gamma_r \geq \gamma_{thresh} \end{cases}$$

One component of adaptive motion compensation embodiments is a dynamic sliding window used for estimating a target instantaneous range rate, in an exemplary embodiment, processing includes:

1) The dynamic window is always centered on the time of the pulse for which an instantaneous range rate is being computed. This effectively produces a non-causal filter, rather than a causal filter which will suffer from some amount of time lag. The centered window provides a zero lag estimate of the target range rate for each pulse time, 2) For a given range cell, the size of the window is determined based on the scatterers coherence. Scatterers with high coherence require a smaller window because phase noise suppression is unnecessary. Small window sizes effectively produce less smoothing which, when there is sufficient SNR, provides a highly localized (in time) estimate of the instantaneous range rate of the scatterer. Conversely, scatterers with lower coherence (although still meeting the coherence threshold to be declared a valid target) use a larger window, producing more smoothing to reduce noise, but doing so at the expense of obtaining a less localized range rate estimate.

Figure 5:
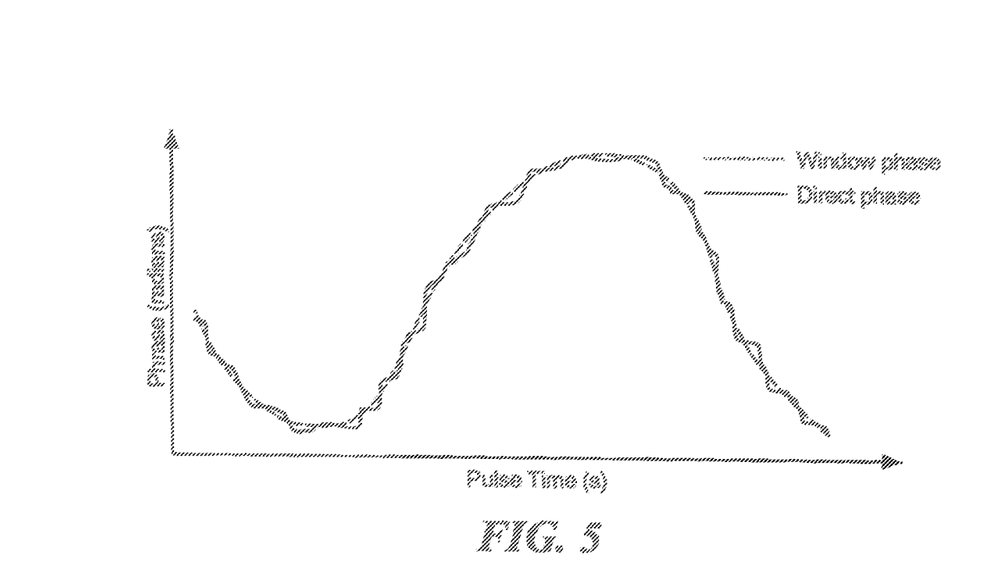
FIG. 5 is a graphical representation of pulse time versus phase.
Figure 6:
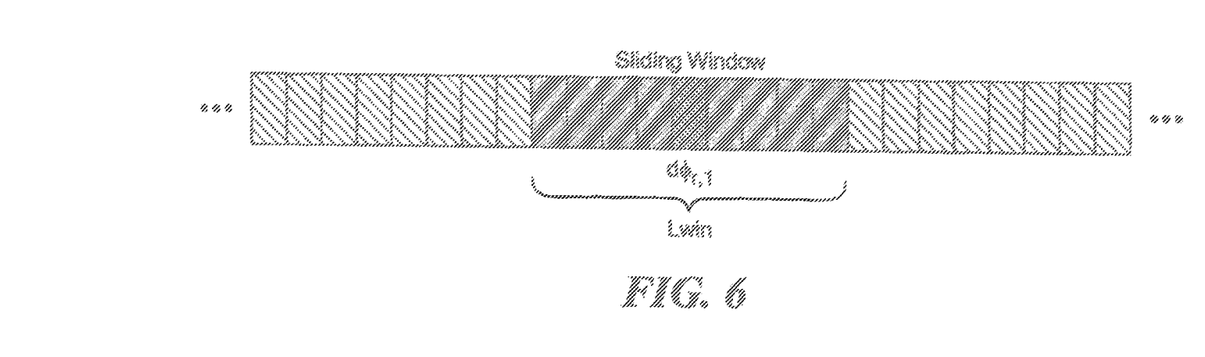
FIG. 6 is a schematic representation of a sliding window.

FIG. 5 shows phase noise suppression (pulse time versus phase) and FIG. 6 shows an exemplary sliding window. The size of the sliding window is set for each range cell that passes the coherence threshold ($I_r = 1$) such that $$Q_{win} = \frac{1 - \gamma_r}{1 - \gamma_{thresh}}$$

is a fractional part of the maximum allowable window size, $L_{win}^{max}$, $$L_{desired} = 2^{\lceil \log_2(L_{win}^{max} Q_{win}) \rceil}.$$

Note that the $\lceil \ \rceil$ represents a ceiling function. The above ensures that the window length is a power of two, however this is not required for exemplary adaptive motion compensation processing to function, but rather merely for convenience.

Finally, to ensure that $$L_{desired} \leq L_{win}^{max}, L_{win} = \min(L_{desired}, L_{win}^{max});$$

the final window size, $L_{win}$, is illustrated as medium gray.

For target range cells passing the coherence threshold ($I_r = 1$), a phase gradient profile is created, $$d\phi_{r,l} = I_r \sum_{k=-K_{win}}^{K_{win}} \tilde{\chi}_{r,l+k}$$

where $0 \leq r \leq R_{tgt} - 1$, $0 \leq l \leq N_{fft} - 1$, where $K_{win}$ is the largest integer less than or equal to $$\frac{L_{win}}{2}$$

that satisfies $1-K_{win} \geq 0$ and $1+K_{win} \leq N_{fft}-1$. Note that this makes $K_{win}$ a function of l, although this dependence is not shown explicitly for convenience.

The phase gradient estimate is indexed by target, but a global estimate is desired. The $d\phi$ estimates are ensembled to obtain a global estimate for the target, $$d\phi_l^g = \sum_{r=0}^{R_{tgt}-1} d\phi_{r,l}$$

where $0 \leq l \leq N_{fft}-1$.

Note that some strong scatterers may contain unfavorable phase terms for focusing, despite passing the coherence threshold. For example, a rotating antenna on a ship will be bright to the sensor, but because it has both translational and rotational motion, it may degrade the focus of other scatterers. Therefore, additional criteria to thin the targets can be done, if desired. In one embodiment, the system can add scatterers to the ensemble one at a time, checking the overall focus between each scatterer to ensure that new targets are improving focus rather than degrading it.

It may be desirable to translate the phase gradient to an instantaneous range rate for downstream processing. The instantaneous range rate is $$dr_l = \frac{\lambda}{4\pi T_{PRI}} d\phi_l^g$$

where $0 \leq l \leq N_{fft}-1$, where $T_{PRI}$ is the radar pulse repetition interval, in seconds, for the CPI.

Some amount of post-processing of the instantaneous range rate estimates may be desirable to handle any Doppler aliasing, and estimation noise at the CPI "edges".

It is possible that, depending on how close the target is to one of the sensor's alias velocities, the range rate for the target could become aliased in Doppler (the phase gradient goes from $-\pi$ to $+\pi$, or vice versa). In this case, the converted range rate jumps by one alias velocity, which can corrupt the adaptive motion compensation processing. To prevent this situation, the global phase gradient calculated above is unwrapped, or alternatively unwrapped here. Additionally, if the radar PRF isn't sufficiently high, a fast-moving target could be aliased in Doppler. For a normal focusing process, such as an autofocus, the alias number is not required since only a phase correction is made. However, exemplary adaptive motion compensation processing performs sub-range cell shifting of the range data for each pulse in the CPI to finely align the range cells, and therefore, a true range rate estimate required. Potential Doppler ambiguities can be resolved by comparing the mean adaptive motion compensation range rate to a prior range rate estimate either from a prior MTI dwell or a track.

It is common for the range rate estimate to suffer from estimation noise near the edges of the CPI (first few pulses and last few pulses) due to lack of smoothing window availability. Generally this fringing effect won't have a significant impact on the overall focus of the final image chip, specially in cases where the dwell is weighted for sidelobe suppression. However, in applications that may want to break down a long dwell into a sequence of shorter (and possibly overlapping) dwells, this can be taken into consideration to address this estimation noise.

For high range resolution data, both a range and phase correction are needed. Range correction removes target range walk over the CPT and the phase correction focuses the scatterers in Doppler. The target range walk due to discrepancies between the MTI-based motion compensation and the time-dependent adaptive motion compensation processing should be corrected. The expected target range walk is $$dR_l^{amc} = \sum_{k=0}^{l} dr_k T_{PRI}$$

where $0 \leq l \leq N_{fft}-1$.

Note that the collection of shifts are generally a fraction of one range cell. Correction can be done in the fast frequency domain using linear phase ramps. This correction causes the scatterers to be finely aligned in range over the duration of the CPI, which reduces impulse response broadening due to uncompensated range walk.

A phase correction removes pulse-to-pulse phase errors. This phase correction will cause the target to be focused in Doppler, $$d\phi_l^{amc} = \sum_{k=0}^{l} d\phi_k^g$$

where $0 \leq l \leq N_{fft}-1$.

The collection of phase terms, $d\phi_l^{amc}$, are applied to all range cells of each pulse in the CPI.

Exemplary embodiments of adaptive motion compensation processing remove sources of translational motion between the sensor phase center and the target scatterers. In general, this processing does not attempt to address rotational motion of scatterers as a function of time. Where rotational motion of the target is expected, adaptive motion processing can be considered a pre-processing step which may then be followed by an Inverse Synthetic Aperture Radar (ISAR) or similar image formation process to address rotational target motion.

Figure 7:
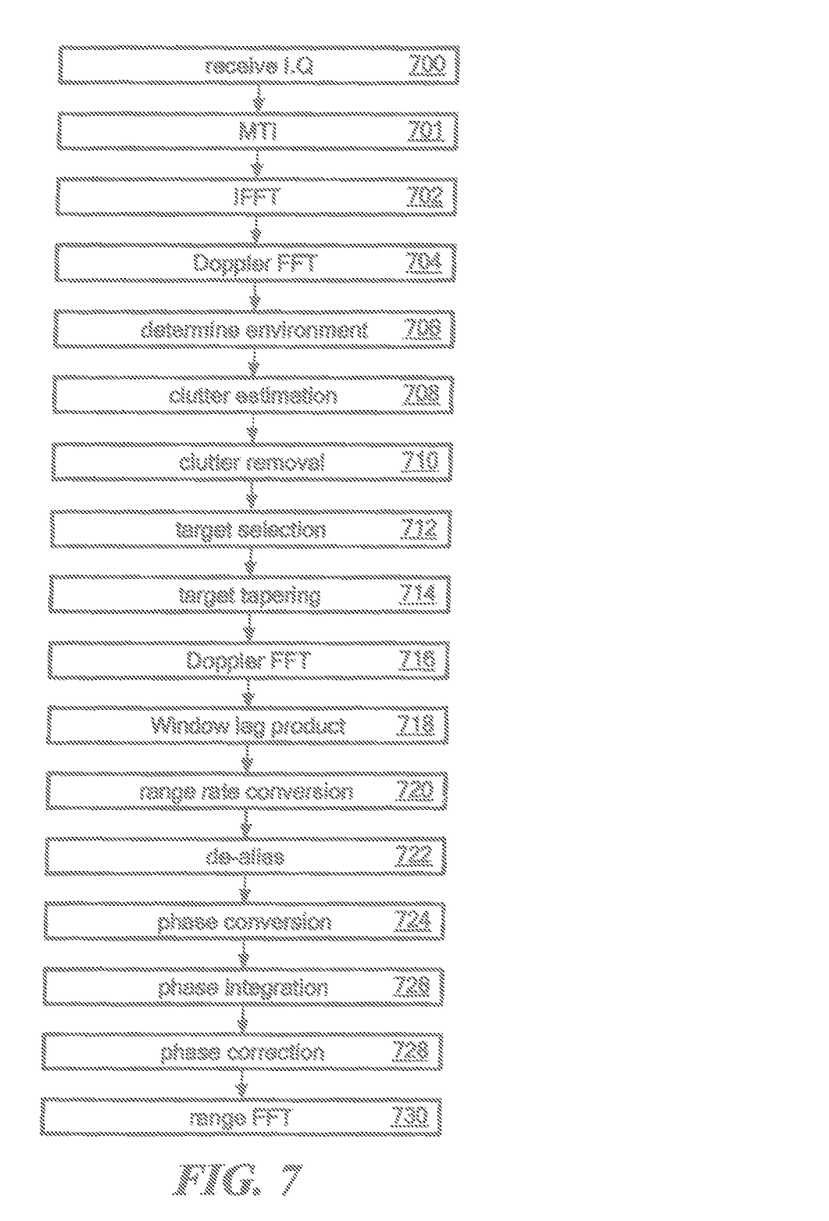
FIG. 7 is a flow diagram showing an exemplary sequence of steps for implementing adaptive motion compensation in accordance with exemplary embodiments of the invention.

FIG. 7 shows an exemplary sequence of steps for implementing adaptive motion compensation processing in accordance with exemplary embodiments of the invention. Range-stabilized I/Q input data is received in step 700 and MTI processing is performed in step 701 for providing MTI cues to facilitate resolving Doppler ambiguities. The MTI output is processed by a range IFFT in step 702 the output of which is processed by a Doppler ITT in step 704.

After processing by the Doppler ET 1, a determine environment processing is performed in step 706 for information to estimate the environment. Clutter estimation is performed in step 708 and clutter removal is performed in step 710 module. In step 712, target selection processing uses a coherence metric to determine the suitability of a particular scatterer for adaptive motion compensation processing. Target tapering processed is performed in step 714 A weighting function (e.g., a low-pass filter) can be applied in the Doppler domain to reduce high-frequency components.

Doppler FFT processing is performed in step 716 using the output of the target tapering. Sliding window lag product processing is performed in step 718 and range rate conversion processing is performed in step 720 to ensemble and convert the phase gradient to a range rate. De-aliasing processing in step 722 unwraps the range rate estimates. Phase conversion processing in step 724 estimates the range rate for the purpose of providing this estimate in the metadata of the final HRR product and for resolving aliases. Phase integration processing in step 726 integrates the phases to produce the phase correction. Phase correction processing in step 728 applies a phase correction the input data (compressed range by pulse). Range FFT processing in step 730 puts the data back in the same domain it was in when the adaptive motion compensation processing was initiated.

While a particular technique has been described for estimating the target environment (e.g., land or sea, to optimize clutter processing), it is understood that any suitable technique can be used to estimate the target environment with greater accuracy. It will be appreciated that enhancing target environment estimating and clutter processing will enhance adaptive motion compensation processing.

Figure 8:
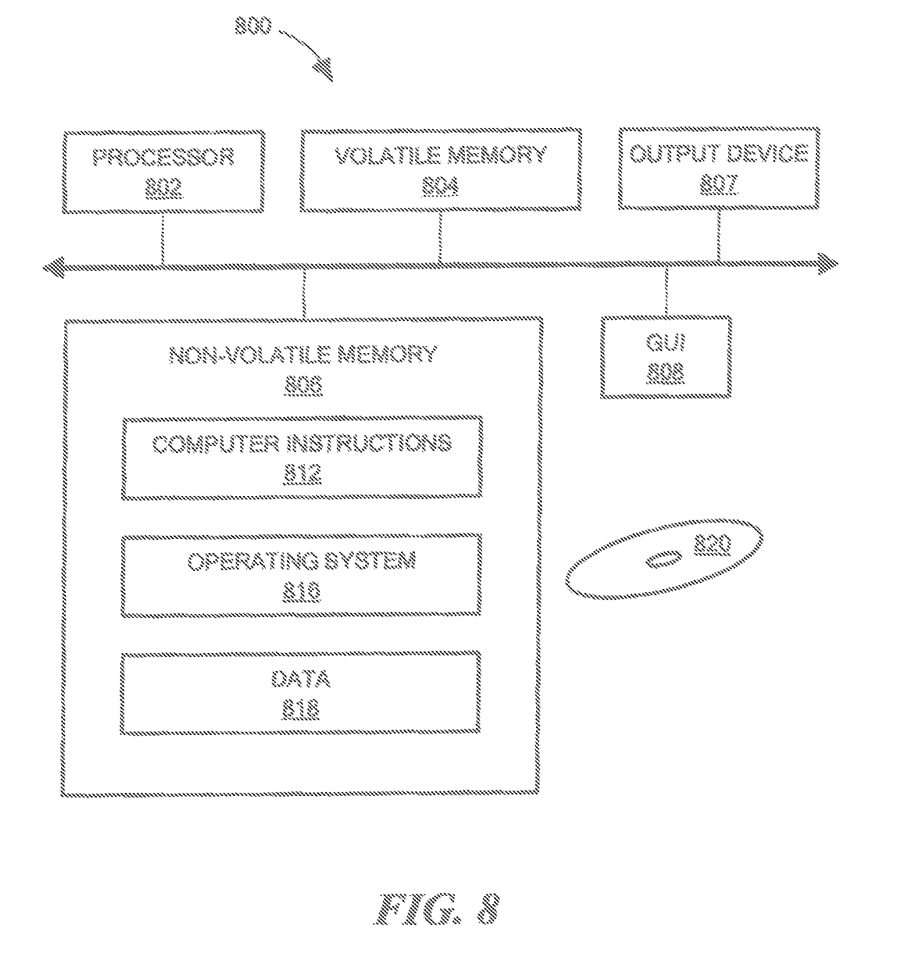
FIG. 8 is a schematic representation of an exemplary computer that can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., a hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   performing adaptive motion compensation to remove translational movement between a sensor and a target using data from the sensor by:
   performing, using a computer processor, clutter removal from the data using a whitener;
   using the whitened data to select a target for which adaptive motion compensation should be performed;
   using weighting in the Doppler domain to reduce frequency components for data for the selected target;
   transforming the weighted Doppler domain data to time domain data; and
   performing dynamic sliding window processing on the time domain data to estimate an instantaneous range rate for the target.

2. The method according to claim 1, further including centering the window on a time of a pulse for which the instantaneous range rate is computed.

3. The method according to claim 1, further including adaptively determining a size of the window based upon coherence of the data.

4. The method according to claim 3, further including, for target range cells above a coherence threshold, computing a phase gradient.

5. The method according to claim 4, further including converting the phase gradient to the instantaneous range rate.

6. The method according to claim 1, further including using a single pulse repetition frequency (PRF) for the adaptive motion compensation processing.

7. The method according to claim 1, further including performing clutter estimation.

8. The method according to claim 7, wherein the clutter estimation includes land clutter or sea clutter determination.

9. The method according to claim 7, wherein performing the clutter estimation further includes using a concavity of a clutter lag profile and/or distance in frequency of a measured clutter peak from an expected clutter peak, wherein the lag profile is computed from augment cells.

10. The method according to claim 1, wherein the sensor forms part of a radar system having an antenna secured to an airborne or space-based platform.

11. The method according to claim 10, further including receiving radar system parameters comprising integration time and smoothing filter gain.

12. An article, comprising:
    a computer readable medium containing stored, non-transitory instructions that enable a machine to perform:
    performing adaptive motion compensation to remove translational movement between a sensor and a target using data from the sensor by:
    performing, using a computer processor, clutter removal from the data using a whitener;

using the whitened data to select a target for which adaptive motion compensation should be performed;

using weighting in the Doppler domain to reduce frequency components for data for the selected target;

transforming the weighted Doppler domain data to time domain data; and performing dynamic sliding window processing on the time domain data to estimate an instantaneous range rate for the target.

13. The article according to claim 12, further including instructions for centering the window on a time of a pulse for which the instantaneous range rate is computed.

14. The article according to claim 12, further including instructions for adaptively determining a size of the window based upon coherence of the data.

15. The article according to claim 14, further including, for target range cells above a coherence threshold, instructions for computing a phase gradient.

16. The article according to claim 15, further including instructions for converting the phase gradient to the instantaneous range rate.

17. The article according to claim 12, further including performing clutter estimation.

18. A system, comprising:
a sensor to illuminate an area;
an antenna to receive signal return from the area;
a clutter removal module to remove clutter from the signal return using a whitener;
a target selection module to receive the clutter-removed data and to select a target for which adaptive motion compensation should be performed;
a weighting module to use weighting in the Doppler domain to reduce frequency components for data for the selected target;
a Doppler frequency module to perform Doppler frequency domain processing on the weighted target data; and
a sliding window module to process the Doppler frequency domain data transformed to time domain data to estimate an instantaneous range rate for the target for removing translation movement between the sensor and the target.

19. The method according to claim 1, wherein the sensor and target are moving.

20. The method according to claim 1, further including determining the adaptive motion compensation on each pulse received by the sensor.

* * * * *